Aug. 19, 1969  W. M. BURSTALL  3,461,666
ELEVATOR LINK AND PROCESS OF MAKING THE SAME
Filed Oct. 17, 1967  4 Sheets-Sheet 2
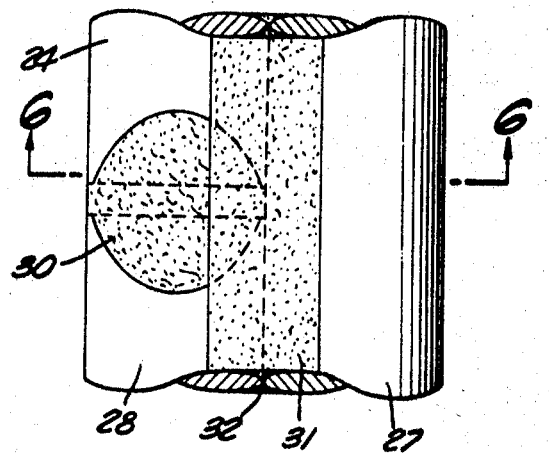
FIG. 4.
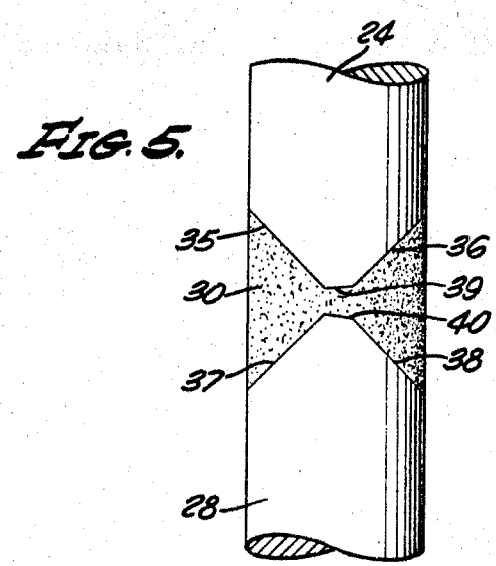
FIG. 5.
FIG. 6.
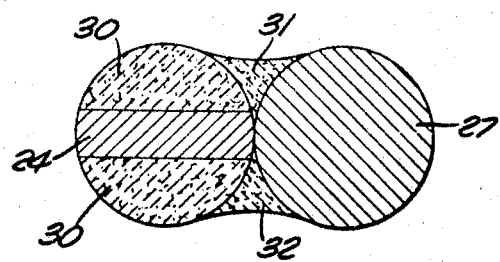
INVENTOR.
WILLIAM M. BURSTALL
BY John O. Evans, Jr.
ATTORNEY Aug. 19, 1969   W. M. BURSTALL   3,461,666
ELEVATOR LINK AND PROCESS OF MAKING THE SAME
Filed Oct. 17, 1967   4 Sheets-Sheet 3

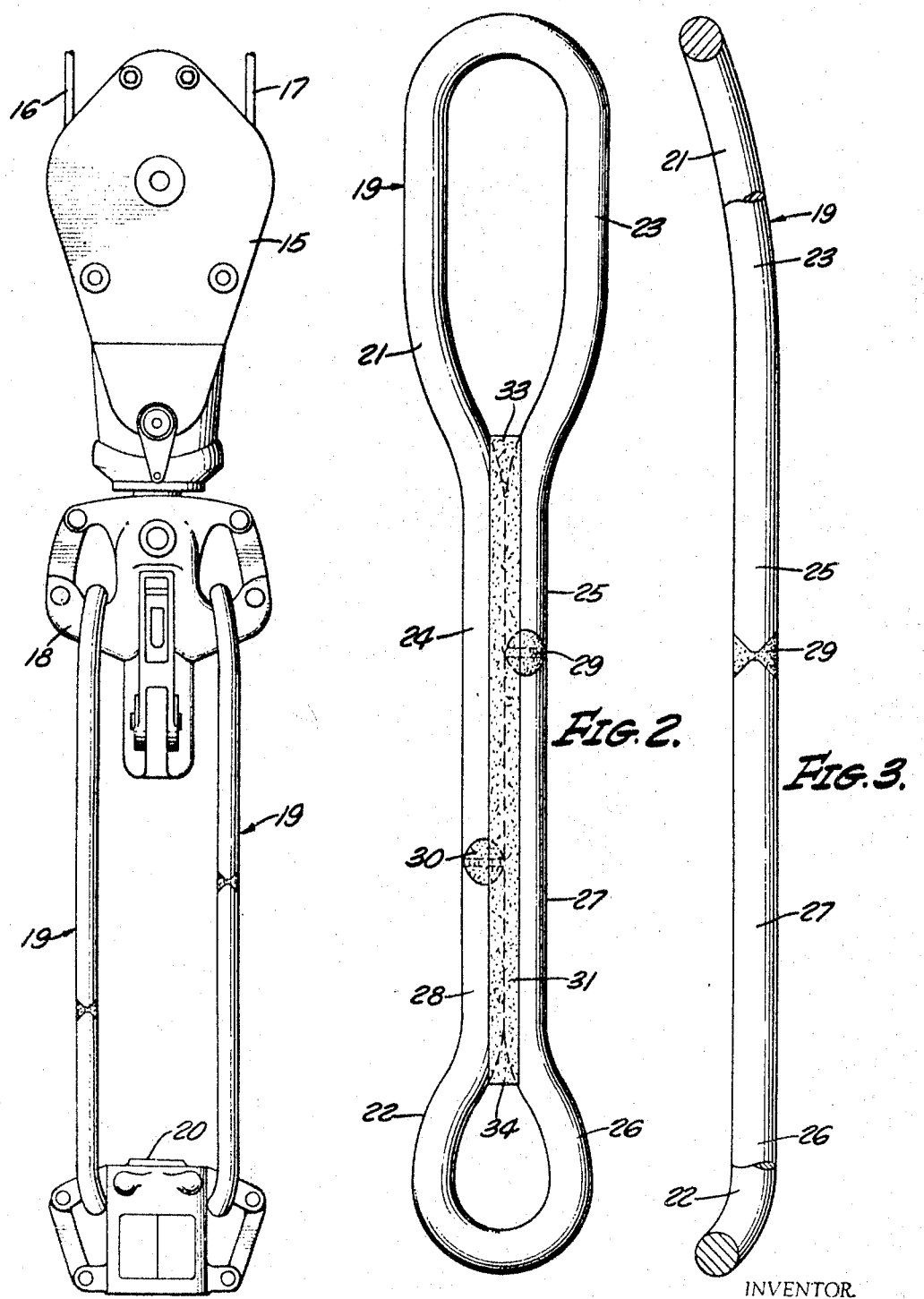

INVENTOR.
WILLIAM M. BURSTALL
BY John O. Evans, Jr.
ATTORNEY

Aug. 19, 1969  W. M. BURSTALL  3,461,666
ELEVATOR LINK AND PROCESS OF MAKING THE SAME
Filed Oct. 17, 1967  4 Sheets-Sheet 4
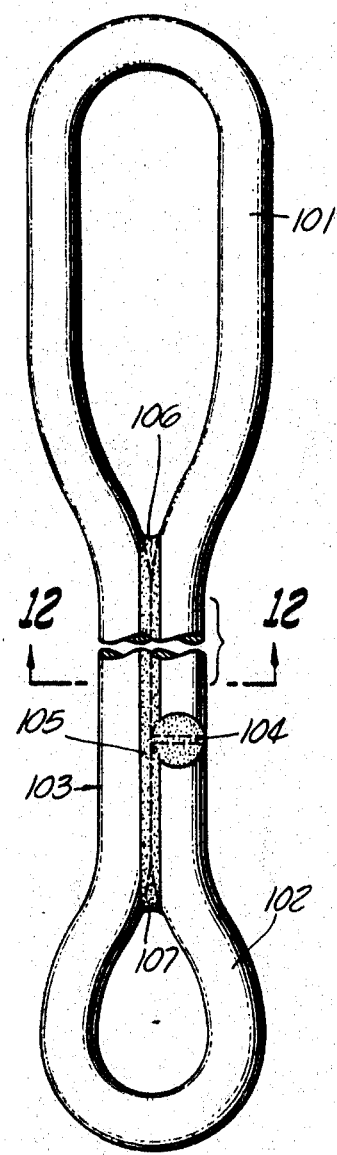
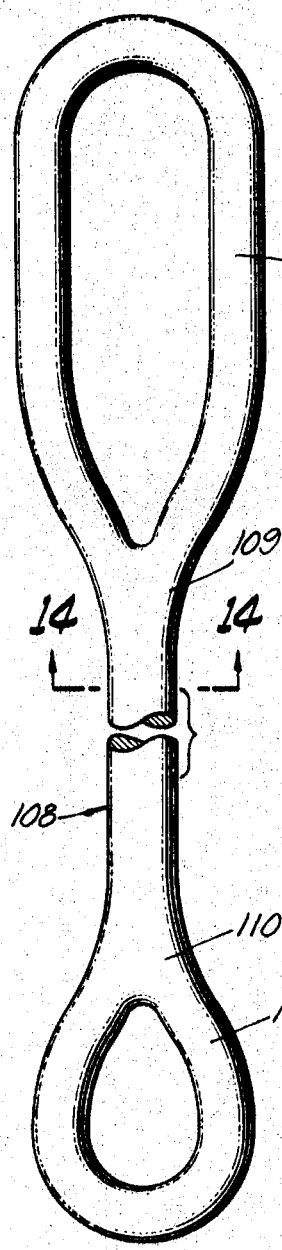
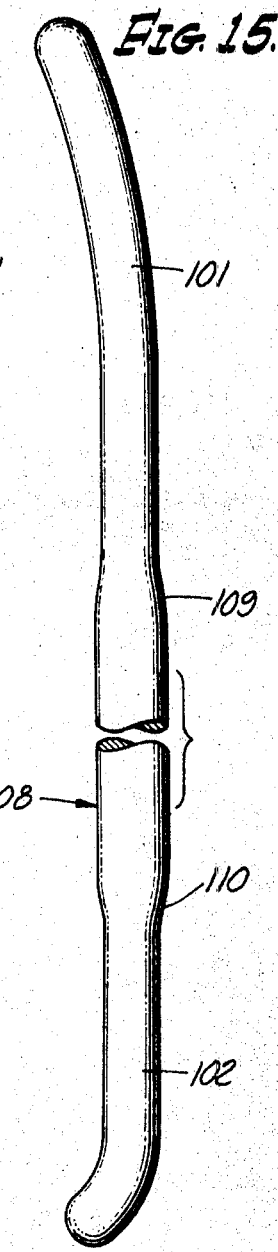
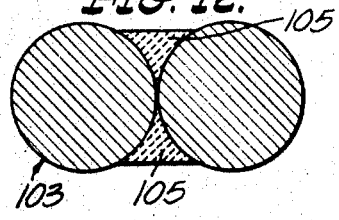
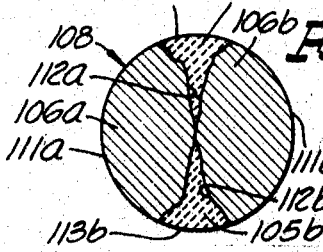
INVENTOR
WILLIAM M. BURSTALL
BY John O. Evans, Jr.
ATTORNEY United States Patent Office 3,461,666
Patented Aug. 19, 1969

3,461,666
ELEVATOR LINK AND PROCESS OF
MAKING THE SAME
William M. Burstall, Huffman, Tex., assignor to Byron
Jackson Inc., Long Beach, Calif., a corporation of
Delaware
Continuation-in-part of application Ser. No. 461,831,
June 7, 1965. This application Oct. 17, 1967, Ser.
No. 676,679
Int. Cl. B21l 13/00
U.S. Cl. 59—35                                    20 Claims

ABSTRACT OF THE DISCLOSURE

An elevator link formed by bending metal bar stock having a grain structure oriented parallel to its axis into the form of an elongated ring with openings or eye portions at its opposite ends, the elongated side sections between the openings being parallel and adjacent to form an elongated shank, which may include a welded joint or joints, the legs of the shank portion having a fillet-type weld extending continuously between the openings. Also disclosed is a method of making the link by bending the metal bar stock into the elongated ring form and welding the shank portion. Further disclosed is a method of working the foregoing link, as by forging it, and the further improved link so produced.

Cross-reference to related application

This application is a continuation-in-part of my copending application, Ser. No. 461,831, filed June 7, 1965, for "Elevator Link and Process of Making the Same," now abandoned.

This invention relates to an elevator link or the like and to a process of making the same.

Elevator links are used in oil well operations such as in drilling a well. They are generally employed in pairs to support a pipe elevator from a hook that is carried by a traveling block suspended from a crown block in a derrick. The elevator grips the pipe for lowering and raising it in the well. Since oil wells are drilled to great depths, long strings of pipes are required to be lowered into and raised from the well. The elevator links are called on to support very heavy loads that may run many hundreds of tons.

Heretofore, such links have been made in a variety of forms and by a number of different methods. Typically, an elevator link is made from bar stock that is pierced and forged to the required shape. The forged link has an eye at each end and a shank connecting the eye portions. The grain of the metal in the shank is oriented longitudinally of the shank but, due to the process of piercing and shaping, the grain of the metal in the eye portions is not oriented in the direction of greatest stress. Therefore, the links are weakest in their eye portions and are subject to breakage here more often than anywhere else.

Heretofore, also, elevator links have been rolled from toroidal sections of steel billets. While these rolled links have a desirable grain orientation running parallel to the elements of the link, they are difficult and expensive to manufacture.

An object of the invention is to provide an elevator link or the like that has great strength.

Another object of the invention is to provide a link that has great strength in its eye portions owing to desirable grain orientation in these portions.

A further object of the invention is to provide an elevator link that has high strength in the shank that connects the eye portions to each other.

Still another object of the invention is to provide an elevator link that is made from round bar stock and that includes at least one welded joint. Owing to the location and construction of this welded joint, the link has great strength especially in its eye portions.

Another object of the invention is to provide a process of manufacturing an elevator link that is simple and relatively inexpensive to carry out.

A further object of the invention is to provide a process for manufacturing an elevator link or the like in a way to orient the grain of the metal in directions to produce maximum strength in the product.

A still further object of the invention is to provide an elevator link or the like wherein the shank of the link has bar sections that are welded together, and wherein both the bar sections and the weld metal have grain structures oriented in the direction of the length of the shank.

Another object is to provide a process of making the link having the characteristics set forth in the immediately preceding object.

The elevator link of the invention includes an elongated ring having generally parallel side sections spaced from each other at opposite ends of the ring to provide openings, the side sections being adjacent to each other to provide a shank portion, a welded joint in one of the side sections in the shank portion, and weld means extending continuously between the openings on both sides of the shank portion for joining the side sections together, the ring being formed of metal having a grain structure oriented substantially parallel to the elements of the ring.

The method of the invention involves bending a metal bar having a grain structure oriented substantially parallel to the axis of the bar into the form of an elongated ring having generally parallel side sections spaced from each other at opposite ends to provide openings, and adjacent to each other intermediate the openings to provide a shank portion, in which the ends of the bar are substantially butted together in said shank portion; applying weld metal to the ends of the bar to join the ends together; and applying additional weld metal, adjacent to and including the weld metal applied to the ends of the bar, for joining the side sections together in the shank portion.

The invention further involves the working, as by forging, of the foregoing links to further improve them, and to the links produced by the working step.

The invention will be described with greater particularity, and other of its aims, objects, and advantages, will be pointed out in, or will be apparent from, the following detailed description taken in connection with the drawings.

In the drawings:

FIG. 1 is an elevational view showing a pair of elevator links, in accordance with the invention, supporting an elevator from a combination hook of a well-derrick traveling block;

FIG. 2 is an enlarged side view of one of the elevator links shown in FIG. 1;

FIG. 3 is a right-hand view of the link shown in FIG. 2, with portions of the link broken away;

FIG. 4 is an enlarged fragmentary view of a portion of the shank of the link shown in the previous figures;

FIG. 5 is a left-hand view of the link portion shown in FIG. 4;

FIG. 6 is a sectional view taken on the line 6—6 of FIG. 4, looking in the direction of the arrows;

FIG. 11 is a side view of a further modified form of an elevator link in accordance with the invention;

FIG. 12 is a somewhat enlarged sectional view taken along the line 12—12 of FIG. 11 and looking in the direction of the arrows;

FIG. 13 is a side view of the elevator link shown in FIG. 11 after it has been forged;

FIG. 14 is a somewhat enlarged sectional view taken on the line 14—14 of FIG. 13 and looking in the direction of the arrows; and FIG. 15 is a right-hand view of the link shown in FIG. 13.

Figure 7:
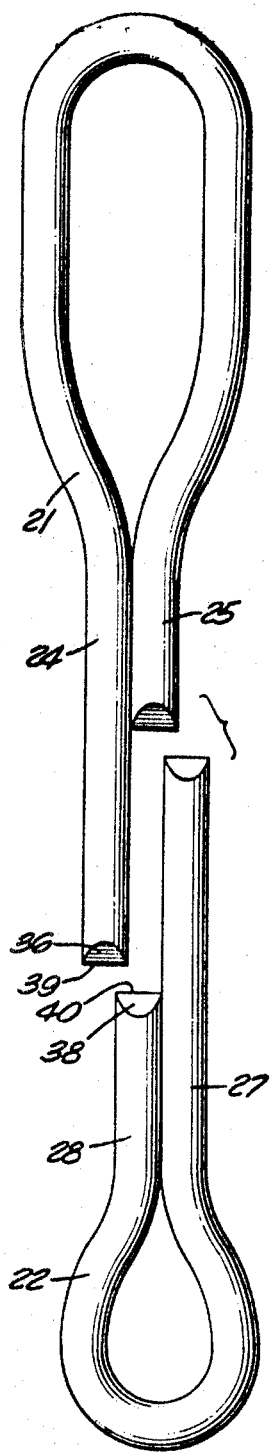
FIG. 7 is a view of the two sections of the foregoing link showing the sections prior to welding.

Referring to the drawings, particularly to FIG. 1, the pipe-hoisting assembly shown includes a traveling block 15 supported by cable having runs 16 and 17 extending from the crown block of a derrick (not shown). The traveling block has a combination hook 18 from which is suspended a pair of elevator links 19—19 made in accordance with the present invention. A pipe elevator 20 is supported by the lower eyes of the links. The traveling block, the hook, and the pipe elevator are conventional components.

Turning now to FIGS. 2 and 3, the elevator link 19 shown therein has an upper section 21 and a lower section 22. These sections are of generally U-shaped configuration. The upper section has an eye portion 23 continuous with and merging into leg portions 24 and 25. The leg portion 24 is longer than the leg portion 25, and these leg portions lie adjacent to and in contact with each other throughout the length of the shorter leg.

Similarly, the lower section 22 has an eye portion 26 that merges into a lower leg portion 27 and a shorter leg portion 28 lying parallel to and in contact with the leg portion 27.

The abutting ends of the leg portions are welded together at 29 and 30. A fillet weld 31 is laid in the groove between the leg portions on one side of the link. This fillet weld extends, as shown in FIG. 2, from the upper eye portion 23 to the lower eye portion 26. A similar fillet weld 32 is laid in the groove on the opposite side of the link structure, as best seen in FIGS. 4 and 6. The ends of the fillet welds 31 and 32 are joined together at their ends through the eyes as shown at 33 and 34 in FIG. 2. The portion of the elevator link extending between the eye portions 23 and 26 is termed the shank of the link.

Referring to FIGS. 4 through 6, there is shown therein a fragment of the shank adjacent to the weld 30. With particular reference to FIG. 5, it is seen that the lower end of the leg portion 24 is beveled to form faces 35 and 36, and that the opposed end of the leg portion 28 is similarly beveled to provide faces 37 and 38. It is also seen that the ends 39 and 40 of the leg portions 24 and 28, respectively, are spaced slightly from each other. The weld metal 30 fills the space between the ends of the leg portions 24 and 28 as shown in FIGS. 4 through 6. Also, the fillet welds 31 and 32 merge into the filler metal 30. A similar filler metal structure exists adjacent to the weld 29.

It is thus seen that the shank portion of the elevator link is a strong composite structure in which the fillet welds 31 and 32 are joined together at their ends 33 and 34 and in which the welds 30 and 29 are joined to the fillet welds 31 and 32.

Figure 8:
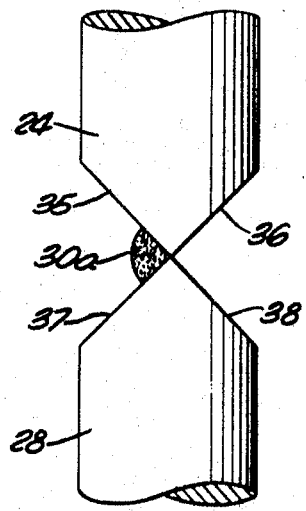
FIG. 8 is an enlarged fragmentary detail view illustrating the first stage of welding together the ends of a link bar.
Figure 9:
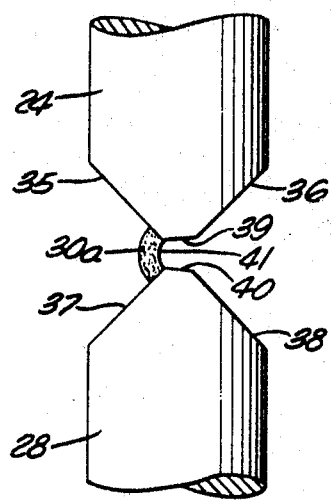
FIG. 9 is a view similar to FIG. 8 showing a second step in the welding operation.

The process of making the link shown in FIGS. 1 through 6, will now be described with particular reference to FIGS. 7 through 9.

FIG. 7 shows the upper section 21 and the lower section 22 of the link laid out near each other preparatory to welding. The upper and lower sections are formed by bending straight, round bar stock to the configurations illustrated. The bar stock is of the required diameter and is rolled steel, for example, of the composition designated A.I.S.I. 4140. The rolling operation, as is well known to metallurgists, orients the grain structure of the bar parallel to the axis of the bar.

The ends of the legs of the upper and lower sections are beveled as hereinbefore described. The legs are cut to proper length so that they will butt together when the upper and lower sections are positioned for welding. The upper and lower sections are brought together with the opposed ends of the legs in abutment.

The making of the weld 30 between abutting leg ends 24 and 28 will now be described with reference to FIGS. 8 and 9. As shown in FIG. 8, a root pass of weld metal 30a is laid in the angle between the faces 35 and 37. After the weld metal 30a has solidified and cooled, the partially welded link is turned over and the edges of the abutting leg sections are ground through from the side opposite to the root weld to form a groove 41 extending through the ends of the leg portions 24 and 28 and into the root pass 30a, as shown in FIG. 9. Thereafter, the remaining space between the beveled faces 35 and 37, the groove 41, and the remaining space between the faces 36 and 38 are filled with weld metal out to the circumference of the leg portions 24 and 28, as shown in FIGS. 4, 5 and 6. It will be understood that the weld 29 between the other pair of abutting legs is similarly made.

After the abutting leg portions are welded together, the fillet welds 31 and 32 are built up.

All welding is accomplished using filler metal compatible with the parent metal of the link sections. For example, where the parent metal is A.I.S.I. 4140, the welding rod used is preferably of the same composition. The hardenability and alloy content of the filler metal is essentially the same as that of the parent metal.

Before any welding is attempted, the link sections are preheated to eliminate any possibility of a stress crack developing in the heat-affected parts of the welded structure. Also, heat treatment of the entire structure is accomplished after welding. By proper selection of welding material and parent metal, a very homogeneous structure is obtained after heat treatment.

By proper selection of heating time, temperature, and quenching media, grain growth is minimized and maximum overall mechanical properties are imparted to the structure. When A.I.S.I. 4140 metals are used, the link is oil quenched and tempered to a Brinell Hardness number of from 3.6 mm. to 3.8 mm.

Since the two full penetration welds at the abutting leg portions are staggered and separated by a considerable distance, yet are connected through long fillet welds, stress levels of all three welds are low, and considerably below the stress in the solid bar of the link eyes. Because of the type and location of the welds, the fabricated link structure of the invention will have a strength equal to, or greater than that of a forged link.

Figure 10:
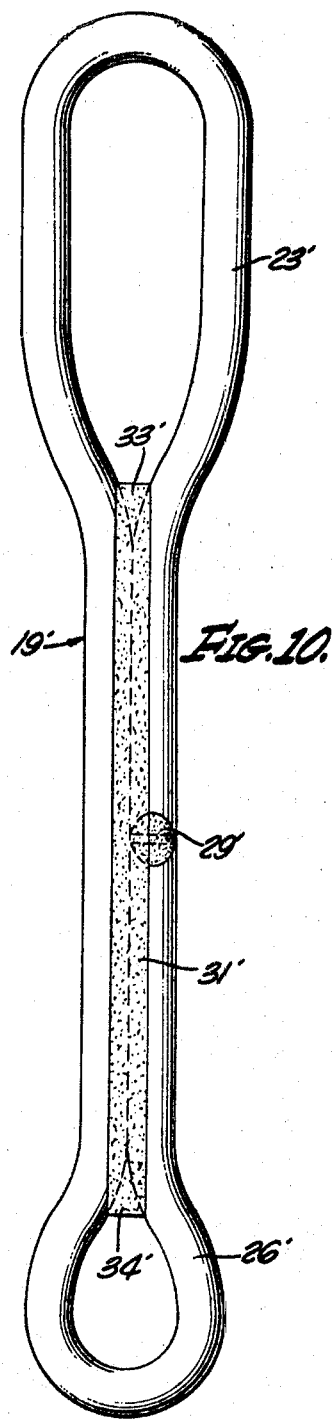
FIG. 10 is a view similar to FIG. 2 of a modified form of an elevator link in accordance with the invention.

A modified form of link in accordance with the invention is shown in FIG. 10. This link differs from that shown and described with reference to FIGS. 1 through 9 in that it has but a single weld in the shank portion. The elongated ring forming the link is made from a single, continuous length of bar stock. This modified link 19' has an upper eye portion 23' and a lower eye portion 26'. The weld 29' between the ends of the bar is similar to the weld 29 or 30 of the previously described form of link. However, the weld 29' preferably is located at about the midpoint between the two eye portions. This is to be contrasted with the welds 29 and 30 of the previously described form of link each of which welds is spaced from a respective eye about one-third of the distance between the eyes. Thus, the welds 29 and 30 are separated from each other by a distance equal to about one-third the length of the shank. In the form of link shown in FIG. 10, the fillet weld 31' has ends 33' and 34' that join with a similar fillet weld on the opposite side of the link.

The link of FIG. 10 is fabricated in substantially the same manner as is the previously described link.

The method in accordance with the invention for working or forging the shank portion of the link will now be described with reference to FIGS. 11 to 15. Referring to FIGS. 11 and 12, the link shown therein is similar to the link shown in FIG. 10 and described hereinbefore. It has an upper eye portion 101, a lower eye portion 102 and a shank portion 103. The shank portion includes a butt weld 104 like the weld 29' of FIG. 10 between the ends of the bar forming the ring from which the link is fabricated. The link has a fillet weld 105 having ends 106 and 107 that join with a similar fillet weld on the other side of the link. The bar from which the link is made is circular in cross-section and has a grain structure oriented parallel to the elements of the bar. This link is further processed to provide the further improved link shown in FIGS. 13, 14 and 15.

Referring to FIGS. 13, 14 and 15, and comparing these figures with FIGS. 11 and 12, it is seen that the shank portion 108 is round (see FIG. 14) rather than 8-shaped as is the shank portion 103 seen in FIG. 12. Also, the shank portion 108 is longer than the shank portion 103. Also, the cross-sectional area of the shank portion 108 is less than the cross-sectional area of the shank portion 103. These changes are effected by hot-forging the shank portion 103, or otherwise working it as by a hot-rolling operation.

The forging of the shank is done using conventional forging equipment in a manner well known to persons ordinarily skilled in the forging art; hence details of the equipment and process need to be set forth herein in extenso. Typically, a pair of forging dies is employed, the dies having mating semi-cylindrical grooves therein to shape the shank into the form of a cylinder. Preferably, the shank is worked back and forth in the die grooves from one end of the shank to the other while the link is at forging temperature. The neck portion 109, intermediate the eye portion 101 and the shank portion 108, is worked between the forging dies to an extent sufficient to provide smooth transition surfaces between the shank portion 108 and the upper eye portion 101. However, the upper eye portion 101 is not forged. Similarly, the neck portion 110, between the shank portion 108 and the lower eye portion 102 is shaped by forging to provide a smooth transition section.

The forging of the shank portion of the link results in an improvement in strength. Referring particularly to FIG. 14, the fillet welds 105a and 105b, and the legs 106a and 106b have been reshaped by the forging process from the corresponding sections as seen in FIG. 12. The legs have outer cylindrical surfaces 111a and 111b that provide portions of the outer surface of the shank portion 108. The legs also have inner surfaces 112a and 112b that face each other and flare outwardly from the axis of the shank portion to provide outwardly flaring grooves that contain the fillet welds 105a and 105b. These fillet welds have outer surfaces 113a and 113b that provide portions of the outer surface of the shank 108. The inner surfaces 112a and 112b of the legs are generally cylindrical and have a radius of curvature slightly greater than the radius of the shank portion 108. As shown in FIG. 14, the inner surfaces 112a and 112b are not smooth but are somewhat uneven and they are tightly welded to the fillet welds 105a and 105b along irregular interfaces. The forging operation forms an improved weld between the legs and the fillet welds. Also, forging tends to eliminate blow holes in the fillet welds and to increase their solidity.

As mentioned, the shank portion 108 is elongated by forging. Such elongation occurs in both the legs 106a and 106b and in the fillet welds 105a and 105b and has the effect of orienting the grain structure of the fillet welds in the direction of elongation, which is parallel to the axis of the shank. The elongation of the legs 106a and 106b also assures and enhances the desired orientation of their grain structures in a direction parallel to the axis of the shank portion 108. Similar effects are produced in the neck portions 109 and 110, but to a somewhat lesser degree for the reason that the neck portions do not receive as much work as the shank portion 108. Of course, the eye portions 101 and 102 are not forged, but they retain their grain structure orientation which is parallel to the elements thereof.

In an exemplary forged elevator link measuring 60″ in length, the extension in length obtained by forging the shank is approximately 6″. As the shank has a length approximately one-half the total length of the leg, or about 30″, the shank is lengthened approximately 20% by the forging operation.

Although the forging step has been described by way of illustration with reference to the link shown in FIG. 11, which has a single full-penetration butt weld 104, it will be understood that a link such as that shown in FIG. 2, which has two butt welds 29 and 30 in the shank, may also be forged in the shank portion to produce improved characteristics.

In an elevator link in accordance with the invention, it is important that the grain of the metal be oriented parallel to the elements of the link and that the eye portions be continuous and free from welded joints. All welding should be confined to the shank. There may be one or two, or even a greater number of leg welds. Where there is but one leg weld, it is preferably located near the middle of the shank. Where there is more than one leg weld, the welds are preferably staggered from side to side of the shank. It is desirable that no leg weld be located too near an eye of the link. The leg welds suitably are of the full-penetration type shown and described hereinbefore, but other types of leg welds, such as butt welds or lap welds may be used.

By preference, fillet welds are applied to both sides of the shank from one end of the shank to the other. Although this practice may be varied to some extent, it is desirable that a fillet weld be applied to each leg weld and that the fillet weld extend for a substantial distance on either side of the leg weld to give strength to the joint.

The invention is not restricted to the use of particular steels and metals of compositions other than the one specifically described herein may be used, depending upon the requirements to be met.

The shapes of the eyes may be changed. Moreover, the bar stock from which the link is fabricated need not be round but may be of some other cross-sectional shape. It may also vary in thickness. For instance, the eye portion may be thicker than the leg portions of a link section.

From the foregoing description, it will be seen that the present invention provides a greatly improved elevator link or the like and an improved process of making the same.

Various modifications will occur to persons skilled in the art without departing from the spirit and scope of the invention as set forth in the following claims.

I claim:
1. An elevator link and the like comprising:
 (a) an elongated ring of generally circular cross-sectional form, said ring having generally parallel side sections spaced from each other at opposite ends of the ring to provide openings, said side sections being adjacent to each other intermediate said openings to provide a shank portion;

(b) a welded joint in one of said side sections in said shank portion; and (c) weld means extending continuously between said openings on both sides of said shank portion for joining said side sections together;

(d) said ring being formed of steel having a grain structure oriented substantially parallel to the elements of the ring.

2. An elevator link and the like as defined in claim 1 wherein said elongated ring, apart from said welded joint, is continuous.

3. An elevator link and the like as defined in claim 1 wherein said weld means are joined together through said openings.

4. An elevator link and the like as defined in claim 1 wherein said welded joint and said weld means merge with each other.

5. An elevator link and the like comprising:
(a) an elongated ring of generally circular cross-sectional form, said ring having generally parallel side sections spaced from each other at opposite ends of the ring to provide openings, said side sections being adjacent to each other intermediate said openings to provide a shank portion;

(b) welded joints, one in each of said side sections in said shank portion, said joints being staggered with respect to each other; and (c) weld means extending continuously between said openings on both sides of said shank portion for joining said side sections together;

(d) said ring being formed of steel having a grain structure oriented substantially parallel to the elements of the ring.

6. An elevator link and the like as defined in claim 5 wherein the portions of said elongated ring between said welded joints are continuous.

7. An elevator link and the like as defined in claim 5 wherein said weld means are joined together through said openings.

8. An elevator link and the like as defined in claim 5 wherein each of said welded joints merges with said weld means.

9. An elevator link and the like comprising:
(a) An elongated ring having generally parallel side sections spaced from each other at opposite ends of the ring to provide openings, said side sections being adjacent to each other intermediate said openings to provide a shank portion;

(b) a welded joint in one of said side sections in said shank portion; and (c) weld means extending continuously between said openings on both sides of said shank portion for joining said side sections together;

(d) said ring being formed of metal having a grain structure oriented substantially parallel to the elements of the ring.

10. A method of making an elevator link and the like which comprises:
(a) bending a metal bar having a grain structure oriented substantially parallel to the axis of the bar into the form of an elongated ring having generally parallel side sections spaced from each other at opposite ends to provide openings, and adjacent to each other intermediate said openings to provide a shank portion, in which the ends of the bar are substantially butted together in said shank portion;

(b) applying weld metal to said ends of the bar to join said ends together; and (c) applying additional weld metal, adjacent to and including said weld metal applied to said ends of said bar, for joining said side sections together in said shank portion.

11. A method of making an elevator link and the like which comprises:
(a) bending a first metal bar having a grain structure oriented substantially parallel to the axis of the bar into a first, generally U-shaped component having an open loop merging into parallel, adjacent leg portions of different lengths;

(b) bending a second metal bar having a grain structure oriented substantially parallel to the axis of the bar into a second, generally U-shaped component having an open loop merging into parallel, adjacent leg portions of different lengths adapted to substantially abut the leg portions of said first component;

(c) assembling said components with their leg portions in substantial abutment with each other;

(d) applying weld metal to the abutting ends of said components to join said ends together; and (e) applying additional weld metal, adjacent to and including said weld metal applied to the abutting ends of said components, for joining said leg portions together.

12. An elevator link and the like comprising:
(a) an elongated ring having generally parallel side sections spaced from each other at opposite ends of the ring to provide openings, said side sections being adjacent to each other intermediate said openings to provide a shank portion;

(b) the portions of said side sections that provide the shank portion having inner surfaces that face each other and flare outwardly from the axis of the shank portion to provide a pair of grooves lying on opposite sides of said axis;

(c) weld means filling said grooves and extending continuously between said openings for joining said side sections together, (d) said ring being formed of metal having a grain structure oriented substantially parallel to the elements of said ring; and (e) said weld means having a grain structure oriented substantially parallel to the axis of the shank portion.

13. An elevator link and the like as defined in claim 12 wherein said shank portion is in the form of a cylinder throughout substantially its entire length, and said portions of said side sections that provide the shank portion have outer surfaces that lie in the outer surface of said shank portion.

14. An elevator link and the like as defined in claim 13 wherein said weld means have outer surfaces that lie in the outer surface of said shank portion.

15. An elevator link and the like as defined in claim 14, wherein said inner surfaces are generally cylindrical and have a radius greater than the radius of said shank portion.

16. An elevator link and the like as defined in claim 12, including a welded joint in one of said side sections in said shank portion.

17. An elevator link and the like as defined in claim 12, including welded joints, one in each of said side portions in said shank portion, said joints being staggered with respect to each other.

18. A method of making an elevator link and the like as defined in claim 10 including working said shank portion, after said weld metal has been applied thereto, to reduce the cross-sectional area of said shank portion and elongate it, whereby to orient the grain structure of said weld metal in the direction of elongation.

19. A method of making an elevator link and the like as defined in claim 10 including forging said shank portion, after said weld metal has been applied thereto, to reduce the cross-sectional area of said shank portion and elongate it, whereby to orient the grain structure of said weld metal in the direction of elongation.

20. A method of making an elevator link as defined in claim 11 including working said leg portions and said weld metal applied thereto to reduce their cross-sectional area and elongate them, whereby to orient the grain structure of said weld metal in the direction of elongation.

References Cited

UNITED STATES PATENTS

| | | | |
|---|---|---|---|
| 385,385 | 7/1888 | Thomson | 59—35 |
| 1,875,905 | 9/1932 | Youngken | 59—35 |
| 1,959,489 | 5/1934 | Miller | 59—35 |
| 2,107,431 | 2/1938 | Taylor | 59—35 |
| 2,242,783 | 5/1941 | Graw | 59—84 |
| 2,822,663 | 2/1958 | Lutts | 59—84 |

FOREIGN PATENTS 1,281,027  11/1961  France.

CHARLES W. LANHAM, Primary Examiner

G. P. CROSBY, Assistant Examiner

U.S. Cl. X.R.

59—84